US012689099B2

(12) United States Patent　　(10) Patent No.:　US 12,689,099 B2
Qiu et al.　　　　　　　　　　　(45) Date of Patent:　Jul. 21, 2026

(54) CELL CONTACTING SYSTEM COMPRISING HEAT-CONDUCTIVE ADHESIVE, BATTERY MODULE STRUCTURE AND BATTERY

(71) Applicant: EVE POWER CO., LTD., Jingmen (CN)

(72) Inventors: Wencong Qiu, Jingmen (CN); Zhaohai Chen, Jingmen (CN); Zhiwei Chen, Jingmen (CN); Fan Li, Jingmen (CN); Chaoju Ren, Jingmen (CN); Yanqiang Feng, Jingmen (CN); Jibing Jiang, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 677 days.

(21) Appl. No.: 18/147,691

(22) Filed: Dec. 28, 2022

(65) Prior Publication Data

US 2023/0411798 A1　　Dec. 21, 2023

Related U.S. Application Data

(63) Continuation of application No. PCT/CN2022/127291, filed on Oct. 25, 2022.

(30) Foreign Application Priority Data

Jun. 17, 2022　(CN) .......................... 202210691692.3
Jun. 17, 2022　(CN) .......................... 202221524993.9

(51) Int. Cl.
　　*H01M 2/10*　　　　(2006.01)
　　*H01M 50/213*　　　(2021.01)
　　　　　　(Continued)

(52) U.S. Cl.
　　CPC ....... H01M 50/507 (2021.01); H01M 50/213 (2021.01); H01M 50/264 (2021.01);
　　　　　　(Continued)

(58) Field of Classification Search
　　CPC ............. H01M 50/507; H01M 50/509; H01M 50/264; H01M 50/262; H01M 50/59;
　　　　　　(Continued)

(56) References Cited

U.S. PATENT DOCUMENTS

2011/0151314 A1 *　6/2011　Ogawa ................ H01M 50/553
　　　　　　　　　　　　　　　　　　429/158
2017/0194771 A1 *　7/2017　Aoki ................... H01M 50/507
2020/0194853 A1　　6/2020　Yoo et al.

FOREIGN PATENT DOCUMENTS

CN　　107134557 A　　9/2017
CN　　207068975 U　　3/2018
　　　　　　(Continued)

OTHER PUBLICATIONS

International Search Report of PCT Patent Application No. PCT/CN2022/127291 issued on Feb. 20, 2023.
(Continued)

*Primary Examiner* — Raymond Alejandro

(57) ABSTRACT

Disclosed are a cell contacting system (CCS), a battery module structure and a battery. The CCS is arranged at the tops of multiple cells, and a gap is formed between each two adjacent cells. The CCS includes a fixing frame and a bus bar. The fixing frame is arranged at the tops of the multiple cells, and is provided with multiple positioning protrusions. Each positioning protrusion can extend into a gap between corresponding adjacent cells and makes contact with side faces of the corresponding cells. The fixing frame is provided with installation holes. The bus bar is embedded in the installation holes, makes contact with and electrically connects the multiple cells. The CCS further includes a heat-conductive adhesive, and the heat-conductive adhesive is arranged on end faces of the fixing frame and the bus bar.

18 Claims, 5 Drawing Sheets

(51) Int. Cl.
| | |
|---|---|
| *H01M 50/264* | (2021.01) |
| *H01M 50/291* | (2021.01) |
| *H01M 50/503* | (2021.01) |
| *H01M 50/507* | (2021.01) |
| *H01M 50/588* | (2021.01) |
| *H01M 50/59* | (2021.01) |

(52) U.S. Cl.
CPC ....... *H01M 50/291* (2021.01); *H01M 50/503* (2021.01); *H01M 50/588* (2021.01); *H01M 50/59* (2021.01)

(58) Field of Classification Search
CPC ............. H01M 50/591; H01M 50/503; H01M 50/502; H01M 50/291; H01M 50/213; H01M 50/588; H01M 50/584; H01M 50/529
See application file for complete search history.

(56) References Cited

FOREIGN PATENT DOCUMENTS

| | | | |
|---|---|---|---|
| CN | 209249529 | U | 8/2019 |
| CN | 211404606 | U | 9/2020 |
| CN | 211530005 | U | 9/2020 |
| CN | 113067108 | A | 7/2021 |
| CN | 213816296 | U | 7/2021 |
| CN | 214176188 | U | 9/2021 |
| CN | 214227080 | U | 9/2021 |
| CN | 113871778 | A | 12/2021 |
| CN | 113937404 | A | 1/2022 |
| CN | 215644733 | U | 1/2022 |
| CN | 114024081 | A | 2/2022 |
| CN | 114122625 | A | 3/2022 |
| CN | 216250972 | U | 4/2022 |
| CN | 216529223 | U | 5/2022 |
| CN | 115172996 | A | 10/2022 |

OTHER PUBLICATIONS

WIPO, International Search Report and Written Opinion for International Application No. PCT/CN2022/127311, Mar. 1, 2023.
Extended European Search Report issued in corresponding EP application No. 22822260.0 dated Jul. 1, 2024.
First Office Action issued in corresponding CN application No. 202210691692.3 dated Feb. 4, 2026.

* cited by examiner

CELL CONTACTING SYSTEM COMPRISING HEAT-CONDUCTIVE ADHESIVE, BATTERY MODULE STRUCTURE AND BATTERY

CROSS REFERENCE TO RELATED APPLICATIONS

The present application is a Continuation Application of PCT Application No. PCT/CN2022/127291 filed on Oct. 25, 2022, which claims the benefit of Chinese Patent Application Nos. 202221524993.9 and 202210691692.3, both filed on Jun. 17, 2022, all contents of which are incorporated herein by reference.

TECHNICAL FIELD

The present application relates to the technical field of batteries, for example, relates to a CCS, a battery module structure and a battery.

BACKGROUND

A battery module, also known as a battery device, is the energy storage unit of a power battery pack. By modularizing a plurality of cells, subsequent installation and use are facilitated. The battery module is widely used in various industries due to the advantages of high power and stable voltage output.

The battery module contains a cell contacting system (CCS), which is complex in structure and mainly includes a support plate and a bus bar. In the related art, the positioning effect between the support plate and the cells is poor, and the cells and the support plate are easily misaligned, which leads to poor connection stability between the bus bar and the cells, and thus leads to risks such as short circuit of the cells, which has great potential safety hazards.

SUMMARY

The present application provides a CCS, which can limit cells to prevent the cells from being short-circuited caused by contact, and at the same time, the CCS can increase the stability of connection between a bus bar and the cells to prevent the cells from being short-circuited caused by excursion of the bus bar.

In a first aspect, an embodiment of the present application provides a CCS, arranged at the tops of a plurality of cells, wherein a gap is formed between adjacent cells, and the CCS includes:

a fixing frame, arranged at the tops of the cells, and provided with a plurality of positioning protrusions, wherein the positioning protrusion extends into the gap between adjacent cells and makes contact with the side faces of the cells, and the fixing frame is also provided with an installation hole; and a bus bar, embedded in the installation hole, wherein the bus bar makes contact with the cells and electrically connects the plurality of cells.

In one embodiment, the bus bar is provided with a positioning hole, the fixing frame is provided with a positioning column, and the positioning column passes through the positioning hole.

In one embodiment, the CCS further includes heat-conductive adhesive, wherein the heat-conductive adhesive is arranged on the end faces of the fixing frame and the bus bar, and can bond the fixing frame and the bus bar.

In one embodiment, the fixing frame is provided with an installation groove, the bus bar is arranged in the installation groove, the installation hole is formed in the bottom face of the installation groove, the side edge of the bus bar, the bottom face of the installation groove and the side wall of the installation groove define an adhesive storage groove, and the adhesive storage groove can accommodate the heat-conductive adhesive.

In one embodiment, the fixing frame is provided with an adhesive passing hole, the adhesive passing hole is located at the top end of the cell, and the heat-conductive adhesive can fill the adhesive passing hole and makes contact with the top end of the cell.

In one embodiment, the bus bar includes a positive electrode connecting part and a negative electrode connecting part, the installation hole includes a positive electrode installation hole and a negative electrode installation hole, the positive electrode connecting part passes through the positive electrode installation hole and is electrically connected with a positive electrode of the cell, and the negative electrode connecting part passes through the negative electrode installation hole and is electrically connected with a negative electrode of the cell.

In a second aspect, the embodiment of the present application provides a battery module structure, which includes the CCS, and further includes a bracket and a plurality of cells, wherein the bottom face of the bracket is provided with a plurality of placing parts, a positioning part is arranged along the periphery of the placing part, the placing part and the positioning part define an accommodating groove, the bottom of the cell is placed in the accommodating groove, and the cell and the bracket are fixedly connected by structural adhesive.

In one embodiment, the positioning part includes a plurality of positioning blocks which are arranged at intervals.

In one embodiment, the positioning block is arranged at the joint between adjacent placing parts.

In one embodiment, the side face of the positioning block is provided with a groove.

In one embodiment, the thickness of the top of the positioning block is smaller than the thickness of the bottom of the positioning block.

In one embodiment, the battery module structure further includes a tray, wherein the bracket is arranged on the tray, the tray is provided with a plurality of pressure relief holes, the placing part is provided with a through hole, and the pressure relief hole communicates with the through hole.

In one embodiment, the bracket is provided with an adhesive overflow hole, an adhesive injection space is formed between the bracket and the tray, and the structural adhesive can flow to the adhesive injection space through the gap between adjacent cells and the adhesive overflow hole.

In one embodiment, the edge of the through hole is provided with a ring rib which forms a communication channel between the pressure relief hole and the through hole, and the ring rib makes contact with the tray.

In one embodiment, the placing part is provided with a raised edge, the raised edge faces the tray, and the raised edge is configured to increase the contact area between the structural adhesive and the bracket.

In a third aspect, the embodiment of the present application also provides a battery, which includes a box and the battery module structure, wherein the battery module structure is arranged inside the box.

The present application has the beneficial effects that:
according to the CCS provided by the present application, the plurality of positioning protrusions are arranged on the side of the fixing frame making contact with the cells, and the positioning protrusions are inserted into the gaps between adjacent cells, so that the assembly of the fixing frame and the cells is realized. The shape of the positioning protrusion is set according to the gap between adjacent cells, so that the positioning protrusion can make contact with the side faces of the cells to play a role in limiting the positions of the cells so as to prevent the cells from being short-circuited caused by contact. The bus bar is arranged at the tops of the cells to electrically connect the plurality of cells. The fixing frame is provided with the installation hole for installing the bus bar, and the bus bar can be embedded in the installation hole and makes contact with and connects with the cells, thus effectively preventing the short circuit of the cells caused by misalignment of the bus bar. The fixing frame provided by the embodiment has a simple structure, can limit the cells and can increase the connection stability between the bus bar and the cells, thus ensuring the stability and safety of the overall structure of the battery.
according to the battery module structure provided by the present application, the bracket is placed at the bottoms of the cells, and the bracket can play a dual role in supporting and positioning the cells. The bracket includes the plurality of placing parts, a positioning part is arranged on the periphery of each placing part, and the placing part and the positioning part define an accommodating groove. Each accommodating groove correspondingly accommodates one cell, and during assembly, the plurality of cells can be installed at the same time, so that the assembly efficiency is greatly improved, the assembly precision is guaranteed, and automation is easy to realize. The structural adhesive is adopted to fixedly connect the bracket with the cells, so that the connection is convenient and reliable, and the cells are effectively prevented from loosening and falling off.
the battery provided by the present application includes the battery module structure and the box, and in the battery, the tops of the cells in the battery are limited by the fixing frame, and the bottoms of the cells are limited by the bracket, so that the cells are firmly limited between the fixing frame and the bracket, and are prevented from being short-circuited due to contact. Meanwhile, at the bottoms of the cells, the structural adhesive is adopted to fix, bond and insulate the cells, the bracket and the tray, so that the whole structure is compact, the strength is high and the safety performance is good.

Figure 1:
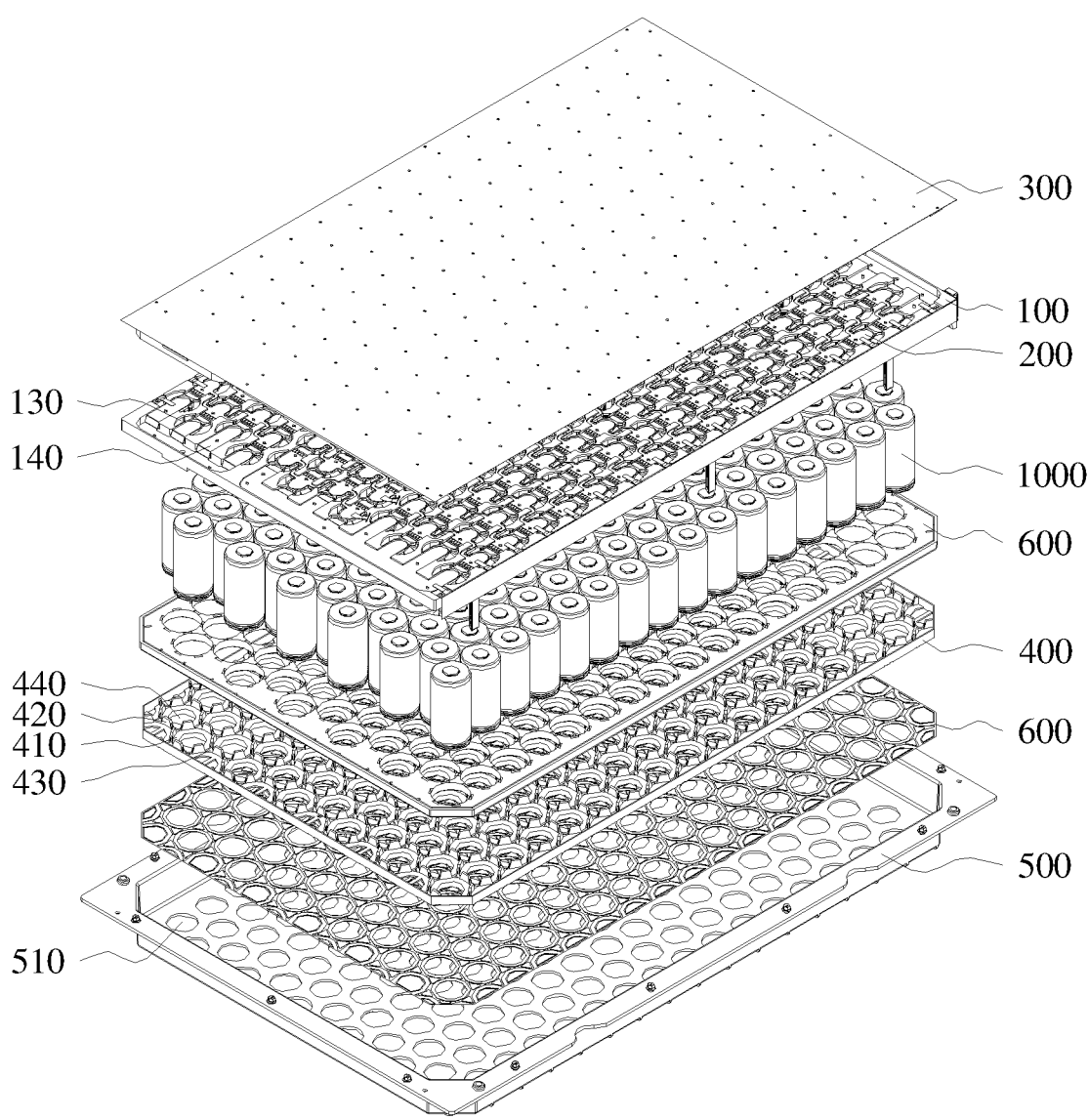
FIG. 1 is an exploded view of a battery module structure provided by an embodiment of the present application.

1000, cell; 100, fixing frame; 101, installation groove; 110, positioning protrusion; 120, installation hole; 121, positive electrode installation hole; 122, negative electrode installation hole; 130, adhesive passing hole; 140, positioning column; 150, adhesive storage groove; 200, bus bar; 210, positive electrode connecting part; 220, negative electrode connecting part; 230, base material; 240, positioning hole; 300, heat-conductive adhesive; 400, bracket; 41, accommodating groove; 410, placing part; 411, ring rib; 412, raised edge; 42, positioning part; 420, positioning block; 421, groove; 430, adhesive overflow hole; 440, through hole; 500, tray; 510, pressure relief hole; 600, structural adhesive.

DETAILED DESCRIPTION OF ILLUSTRATED EMBODIMENTS

In the description of the present application, it should be noted that the orientation or positional relationships indicated by terms such as "central", "upper", "lower", "left", "right", "vertical", "horizontal", "inner" and "outer" are the orientation or positional relationships based on the accompanying drawings, are merely intended to facilitate description of the present application and simplifying of the description, rather than to indicate or imply that the device or element referred to must have a specific orientation or be constructed and operated in a specific orientation. In addition, the terms "first" and "second" are only used for descriptive purposes, and cannot be understood as indicating or implying relative importance. Wherein, the terms "first position" and "second position" are two different positions. Moreover, the first feature being "on", "above and "over" the second feature includes that the first feature is directly above and obliquely above the second feature, or only indicates that the horizontal height of the first feature is higher than that of the second feature. The first feature being "under", "below" and "beneath" the second feature includes that the first feature is directly below and obliquely below the second feature, or only indicates that the horizontal height of the first features is smaller than that of the second feature.

In the description of the present application, it should be noted that the terms "installed", "connected" and "connection" should be understood in a broad sense unless otherwise specified and defined, for example, "connection" may be fixed connection or detachable connection or integrated connection, may be mechanical connection or electric connection, and may be direct connection or indirect connection through an intermediate medium, or internal communication of two elements. For a person having ordinary skill in the art, the specific meanings of the above terms in the present application can be understood according to specific situations.

Embodiments of the present application will be described below, examples of which are shown in the accompanying drawings, in which the same or similar reference numerals refer to the same or similar elements or elements with the same or similar functions throughout. The embodiments described below with reference to the drawings are exemplary and only used to explain the present application.

Figure 2:
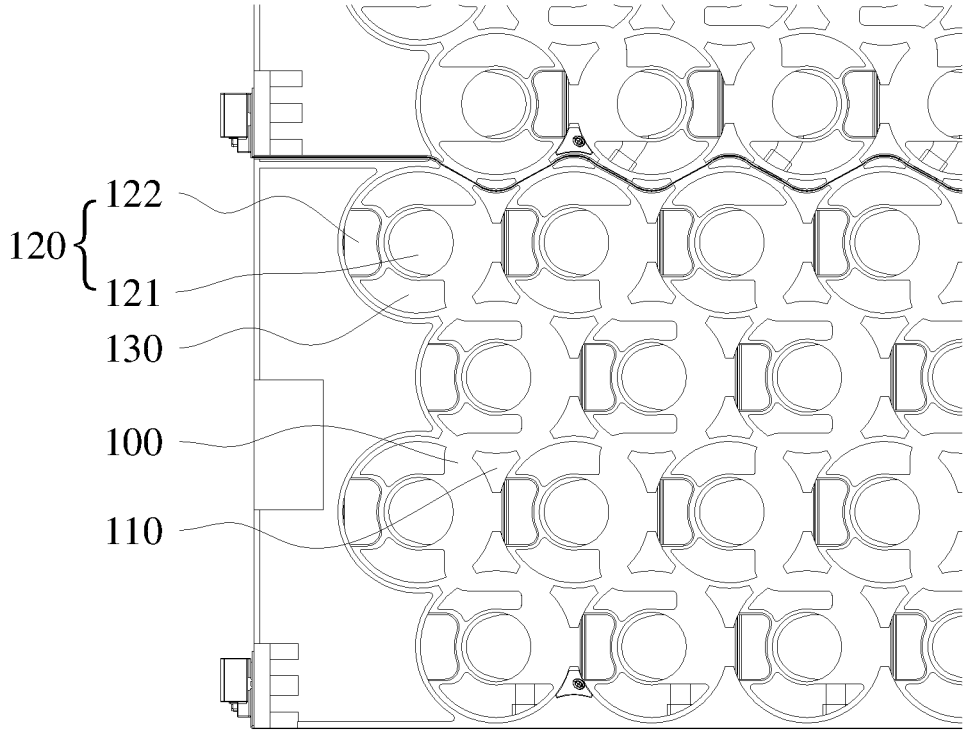
FIG. 2 is a schematic diagram of a partial structure of the bottom of a fixing frame provided by an embodiment of the present application.

Referring to FIGS. 1 and 2, this embodiment provides a CCS, which is arranged at the tops of a plurality of cells 1000, and a gap is formed between adjacent cells 1000. The CCS includes a fixing frame 100 and a bus bar 200. The fixing frame 100 is arranged at the tops of the cells 1000, and is provided with a plurality of positioning protrusions 110, the positioning protrusion 110 can extend into the gap between adjacent cells 1000 and makes contact with the side faces of the cells 1000, and the fixing frame 100 is also provided with installation holes 120. The bus bar 200 is embedded in the installation holes 120. The bus bar 200 makes contact with the cells 1000 and electrically connects the plurality of cells 1000.

According to the CCS, by arranging the plurality of positioning protrusions 110 on one side of the fixing frame 100, the positioning protrusions 110 can be inserted into the gaps between adjacent cells 1000 when the fixing frame 100 and the cells 1000 are assembled. The shape of the positioning protrusion 110 is set according to the gap between adjacent cells 1000, so that the positioning protrusion 110 can make contact with the side faces of the cells 1000 to play a role in limiting the positions of the cells 1000 so as to prevent the cells 1000 from being short-circuited caused by contact. In order to electrically connect the plurality of cells 1000, the bus bar 200 is arranged at the tops of the cells, and the installation holes 120 for installing the bus bar 200 are formed in the fixing frame 100, and the bus bar 200 is embedded into the installation holes 120 and makes contact with and is connected with the cells 1000, thus effectively preventing the short circuit of the cells 1000 caused by the misalignment of the bus bar 200. The fixing frame 100 provided in this embodiment has a simple structure, can limit the cells 1000, and facilitates the connection stability between the bus bar 200 and the cells 1000, thus ensuring the stability and safety of the overall structure of the battery.

Figure 3:
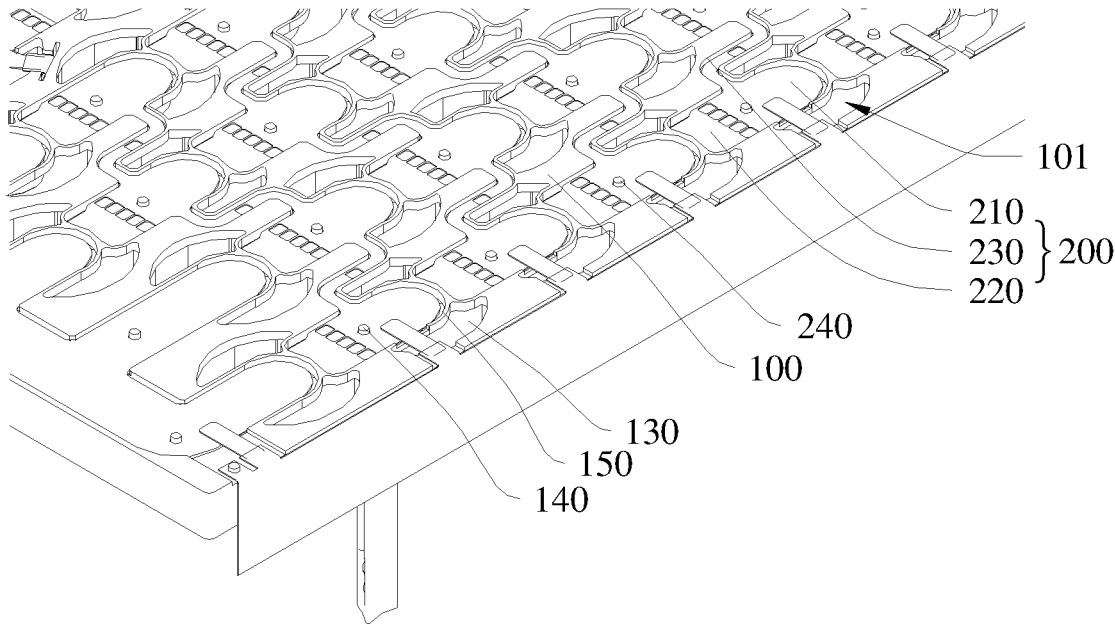
FIG. 3 is a schematic diagram of a partial structure of a CCS provided by an embodiment of the present application.

Referring to FIGS. 1 to 3, the fixing frame 100 provided in this embodiment may be made of plastic or other insulating materials, so as to avoid the danger of short circuit between the cells 1000. The fixing frame 100 is rectangular as a whole, and includes an end face and side plates connected to the end face. When the fixing frame 100 and the cells 1000 are assembled, the fixing frame 100 is buckled on the tops of the cells 1000, and the positioning protrusions 110 are inserted into the gaps between adjacent cells 1000. The side plates can play a role in limiting cells 1000 located outside, so that the overall structure is compact and reliable. In this embodiment, the cells 1000 are arranged in such a way that a gap is formed among three adjacent cells 1000, and the gap is roughly in the shape of triangular prism. Therefore, the cross section of the positioning protrusion 110 on the fixing frame 100 is roughly in the shape of triangle, three sides of the triangle have certain radians, and the radians are set according to the outer diameter of the battery.

Exemplarily, referring to FIGS. 2 and 3, the bus bar 200 includes a positive electrode connecting part 210 and a negative electrode connecting part 220, the installation hole 120 includes a positive electrode installation hole 121 and a negative electrode installation hole 122, the positive electrode connecting part 210 passes through the positive electrode installation hole 121 and is electrically connected with the positive electrode of the cell 1000, and the negative electrode connecting part 220 passes through the negative electrode installation hole 122 and is electrically connected with the negative electrode of the cell 1000. Exemplarily, the bus bar 200 includes a plurality of single bus bars, each single bus bar includes a positive electrode connecting part 210 and a negative electrode connecting part 220, and two single bus bars are connected by a base material 230. Compared with enabling the positive electrode installation hole 121 and the negative electrode installation hole 122 to communicate into a whole, setting the positive electrode installation hole 121 and the negative electrode installation hole 122 separately can improve the connection reliability of the cells 1000, effectively avoid the short circuit of the cells 1000 caused by the misalignment of the bus bar 200 or poor contact of the bus bar 200 with the cells 1000, and increase the structural strength of the fixing frame 100.

Referring to FIG. 3, the bus bar 200 is provided with positioning holes 240, the fixing frame 100 is provided with positioning columns 140, and the positioning columns 140 pass through the corresponding positioning holes 240, so as to position the bus bar 200 and prevent misalignment between the bus bar 200 and the cells 1000. In this embodiment, each single bus bar is provided with a positioning hole 240, which is arranged between the positive electrode connecting part 210 and the negative electrode connecting part 220, and the positioning column 140 is arranged between the positive electrode installation hole 121 and the negative electrode installation hole 122. The positioning hole 240 and the positioning column 140 should be matched in position and shape. In other embodiments, the positioning column 140 may also be arranged on the base material 230 or the positive electrode connecting part 210 or the negative electrode connecting part 220.

Exemplarily, the CCS also includes heat-conductive adhesive 300, and the heat-conductive adhesive 300 is arranged on the end faces of the fixing frame 100 and the bus bar 200, and can bond the fixing frame 100 and the bus bar 200. During the charging and discharging processes of the battery, the bus bar 200 is seriously locally hot, and due to the arrangement of the heat-conductive adhesive 300, the heat of the bus bar 200 can be transferred to a part with lower temperature, so as to avoid potential safety hazards such as thermal runaway of the cells 1000 caused by overhigh local temperature inside the battery. In addition, due to the arrangement of the heat-conductive adhesive 300, the bus bar 200 and a bracket 400 can be sticked, thus increasing the rigidity and stability of the structure.

Referring to FIG. 3 again, the fixing frame 100 is provided with installation grooves 101, the bus bar 200 is arranged in the installation grooves 101, the installation hole 120 is formed in the bottom face of the installation groove 101, the side face of the bus bar 200, the bottom face of the installation groove 101 and the side wall of the installation groove 101 define an adhesive storage groove 150, and the adhesive storage groove 150 can accommodate the heat-conductive adhesive 300. The cross-sectional area of the installation groove 101 is larger than that of the bus bar 200. Therefore, after the bus bar 200 is placed in the fixing frame 100, there is a circle of gap around the bus bar 200, which is the adhesive storage groove 150. With this structure, more heat-conductive adhesive 300 can be accommodated, and the heat transfer effect and the stability of connection between parts can be enhanced. Exemplarily, the height of the installation groove 101 is larger than the thickness of the bus bar 200, so the heat-conductive adhesive 300 can fill the surface of the bus bar 200 to cover the bus bar 200, which can also improve the heat transfer effect and increase the firmness of connection between parts.

Exemplarily, the fixing frame 100 is provided with an adhesive passing hole 130, the adhesive passing hole 130 is located at the top end of the cell 1000, and the heat-conductive adhesive 300 can fill the adhesive passing hole 130 and makes contact with the top end of the cell 1000. Due to the arrangement of the adhesive passing hole 130, the heat-conductive adhesive 300 can directly make contact with part of the surface of the top end of the cell 1000 to directly transfer the heat generated by the cell 1000, so as to quickly reduce the heat of the cell 1000, thus ensuring the safety of the cell 1000. In this embodiment, the shape of the adhesive passing hole 130 may be set according to the shape of the bus bar 200, and the area of the adhesive passing hole 130 should be large enough, but at the same time, it should be guaranteed that the bracket 400 have sufficient structural strength. In other embodiments, the adhesive passing hole 130 may also be a round hole, a square hole or a waist-shaped hole.

Figure 4:
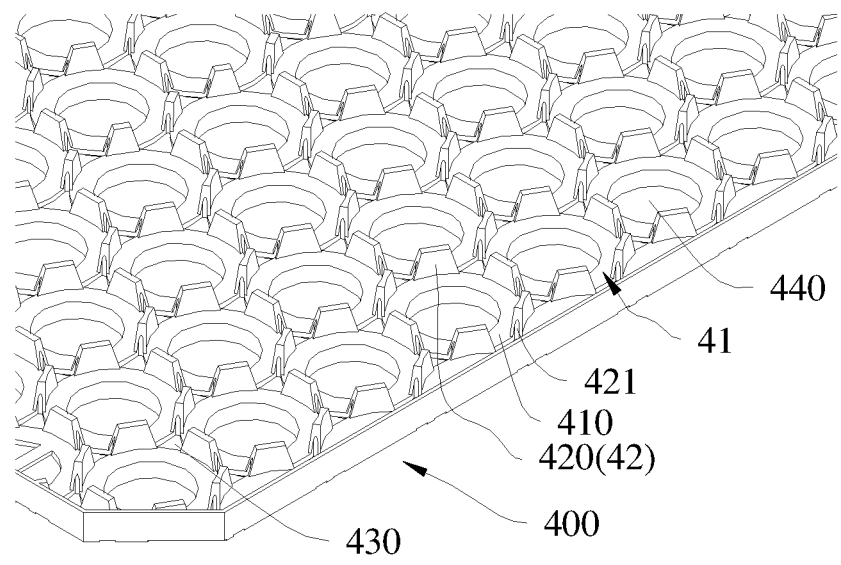
FIG. 4 is a first schematic diagram of a partial structure of a bracket provided by an embodiment of the present application.

Referring to FIG. 4, this embodiment also provides a battery module structure, which includes the above CCS and a bracket 400. The bottom face of the bracket 400 is provided with a plurality of placing parts 410, a positioning part 42 is arranged along the periphery of the placing part 410, the placing part 410 and the positioning part 42 define an accommodating groove 41, the bottom of the cell 1000 is placed in the accommodating groove 41, and the cell 1000 and the bracket 400 are fixedly connected by structural adhesive 600. The outer contour of the placing part 410 is designed as a circle according to the shape of the bottom of the cell 1000, and the splicing positions of the placing parts 410 are tangent and connected with each other. The bracket 400 is placed at the bottoms of the cells 1000, and can play a dual role in supporting and positioning the cells 1000. Since the positioning part 42 is arranged on the periphery of the placing part 410, the placing part 410 and the positioning part 42 define the accommodating groove 41, the cell 1000 is placed in the accommodating groove 41, and each accommodating groove 41 corresponds to one cell 1000, during assembly, the plurality of cells 1000 can be installed at the same time, so that the assembly efficiency is greatly improved, the assembly precision is ensured, and automation is easy to realize. The structural adhesive 600 is adopted to fixedly connect the bracket 400 and the cells 1000, so that the connection is convenient and reliable, and the cells 1000 are effectively prevented from loosening and falling off.

Exemplarily, the positioning part 42 includes a plurality of positioning blocks 420, which are arranged at intervals. Two surfaces of the positioning block 420 are both cambered surfaces, and the two cambered surfaces respectively face two different cells 1000. In other embodiments, the positioning part 420 may also be a cylindrical structure which is arranged on the periphery of the placing part 410 and extends towards the top of the cell 1000, or a plurality of curved-plate-shaped structures which are arranged along the periphery of the positioning part 42. Any structure form which can position the cell 1000 falls within the protection scope of the present application.

Exemplarily, the positioning block 420 is arranged at the joint between adjacent placing parts 410. In this embodiment, six other placing parts 410 are connected to the periphery of each placing part 410 located in the middle of the bracket 400, therefore, six positioning blocks 420 are arranged on the periphery of the placing part 410. In other embodiments, the number of the positioning blocks 420 may be three, five or other, and the positions of the positioning blocks 420 may be set according to the actual arrangement of the cells 1000.

Exemplarily, the thickness of the top of the positioning block 420 is smaller than the thickness of the bottom of the positioning block 420, and the width of the top of the positioning block 420 is smaller than the width of the bottom of the positioning block 420. For the battery module structure that needs to fill the bottom of the cell 1000 with the structural adhesive 600, such a structure which is thin at the top and thick at the bottom and narrow at the top and wide at the bottom and is adopted by the positioning block 420 can increase the contact area between the structural adhesive 600 and the positioning block 420 as well as the contact area between the structural adhesive 600 and the cell 1000, so that the bonding is firmer, the cell 1000 and the bracket 400 are not easy to loosen, and the bracket 400 can be demolded more conveniently, thus reducing the fabrication difficulty. Optionally, the side face of the positioning block 420 may be provided with a groove 421, which can accommodate the structural adhesive 600. In this embodiment, two side faces of the positioning block 420 are each provided with a groove 421, and the grooves 421 are V-shaped grooves, can increase the creepage distance, ensure the electrical safety, increase the adhesive bonding area and increase the grouping strength. In order to increase the adhesive bonding area, in this embodiment, the diameter of the circle defined by the bottoms of the positioning blocks 420 is slightly larger than the diameter of the bottom of the cell 1000, with the diameter difference therebetween ranges from 0.1 mm to 0.4 mm, which, for example, may be 0.1 mm, 0.2 mm or 0.3 mm. In other embodiments, the bottom of the positioning part 42 may make contact with the bottom of the cell 1000, so as to clamp the cell 1000 into the positioning part 42.

Referring to FIG. 1, and FIG. 4 to FIG. 6, in one embodiment, the battery module structure further includes a tray 500, the bracket 400 is arranged on the tray 500, the tray 500 is provided with a plurality of pressure relief holes 510, the placing part 410 is provided with a through hole 440, and the pressure relief hole 510 communicates with the through hole 440. The tray 500 can play a role in supporting the bracket 400, and at the same time, due to the arrangement of the pressure relief holes 510 and the through holes 440, the heat of the cells 1000 or the gas generated when thermal runaway of the battery occurs can be quickly guided out of the bottoms of the cells 1000, thus enhancing the heat dissipation effect and increasing the safety performance of the overall structure of the battery. In this embodiment, the tray 500 is made of metal, the bracket 400 is made of plastic or other materials with good insulating property, and the placing part 410 can prevent the bottom face of the cell 1000 from making contact with the tray 500, thus playing an insulation protection role.

Exemplarily, the bracket 400 is provided with an adhesive overflow hole 430, an adhesive injection space is formed between the bracket 400 and the tray 500, the structural adhesive 600 can flow into the adhesive injection space through the gap between adjacent cells 1000 and the adhesive overflow hole 430, and the structural adhesive 600 is configured to bond the tray 500, the bracket 400 and the cells 1000. In this embodiment, an unconnected part among three adjacent placing parts 410 forms one adhesive overflow hole 430, the shape of the adhesive overflow hole 430 is set according to the gap between the cells 1000, and six adhesive overflow holes 430 are formed around each placing part 410. In other embodiments, the number and shape of the overflow holes 430 may be correspondingly set according to the arrangement of the cells 1000. Understandably, the gap between the cells 1000, the adhesive overflow hole 430 and the adhesive injection space between the bracket 400 and the tray 500 communicate. The structural adhesive 600 can fill the adhesive injection space to bond the tray 500 and the bracket 400. At the same time, the structural adhesive 600 can fill the gaps between adjacent cells 1000 to bond the plurality of cells 1000. In addition, the structural adhesive 600 can fill the periphery of the positioning block 420 to bond the bracket 400 and the cells 1000. The structural adhesive 600 can also play an insulating role between adjacent cells 1000 as well as between the cells 1000 and the tray 500 in addition to a bonding role.

Figure 5:
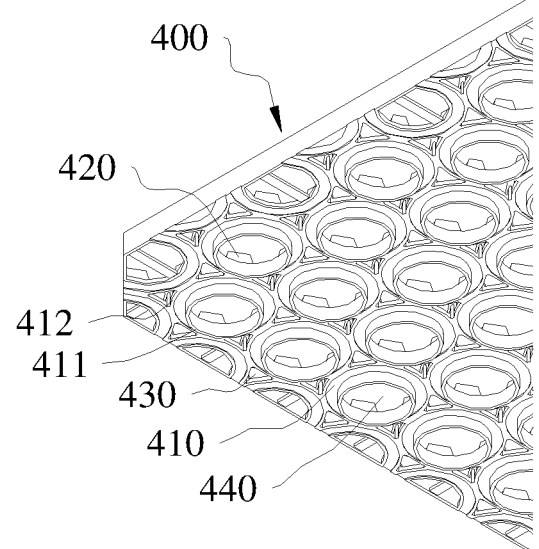
FIG. 5 is a second schematic diagram of a partial structure of a bracket provided by an embodiment of the present application.
Figure 6:
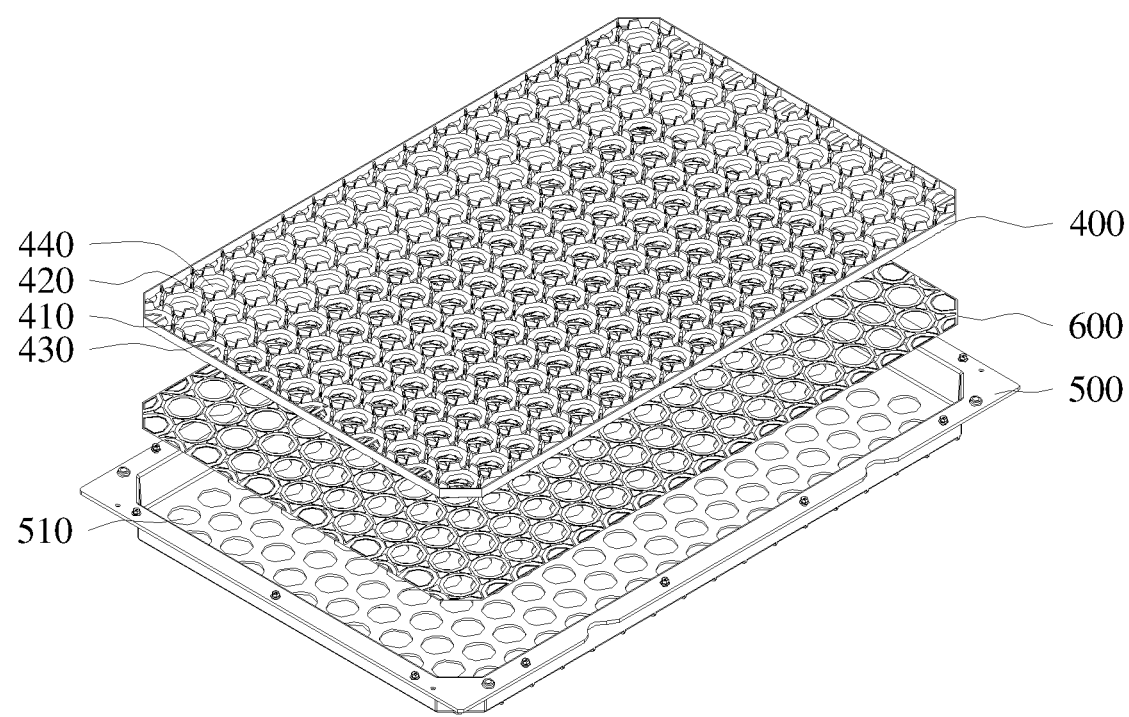
FIG. 6 is an exploded view of a partial structure of a battery module structure provided by an embodiment of the present application.

Referring to FIGS. 5 and 6, the edge of the through hole 440 is provided with a ring rib 411, which forms a communication channel between the pressure relief hole 510 and the through hole 440, and the ring rib 411 makes contact with the tray 500. The ring rib 411 plays a supporting role between the bracket 400 and the tray 500. The ring rib 411 is arranged on the inner ring of the placing part 410, so there is a certain interval between adjacent ring ribs 411, and the ring rib 411 has a certain height, so that an adhesive injection space is formed between the bracket 400 and the tray 500, and the structural adhesive 600 can fill the adhesive injection space. At the same time, by enabling the pressure relief hole 510 to communicate with the through hole 440, when thermal runaway of a certain cell 1000 occurs, high-temperature gas generated by the cell 1000 can quickly pass through the through hole 440 and overflow from the pressure relief hole 510 along the ring rib 411, thus effectively preventing the high-temperature gas from spreading to the bottom of other cells 1000 and reducing the risk of thermal runaway of other cells 1000.

Exemplarily, the placing part 410 is provided with a raised edge 412, and the raised edge 412 faces the tray 500 and is configured to increase the contact area between the structural adhesive 600 and the bracket 400, thereby increasing the bonding firmness. In this embodiment, the raised edge 412 is arranged around the periphery of the placing part 410, a groove is formed between the raised edge 412 and the ring rib 411, and the structural adhesive 600 can fill the groove. In other embodiments, the raised edge 412 may also be one or more columnar structures, and any structure form that can increase the bonding firmness between the structural adhesive 600 and the tray 500 falls within the protection scope of the present application.

Figure 7:
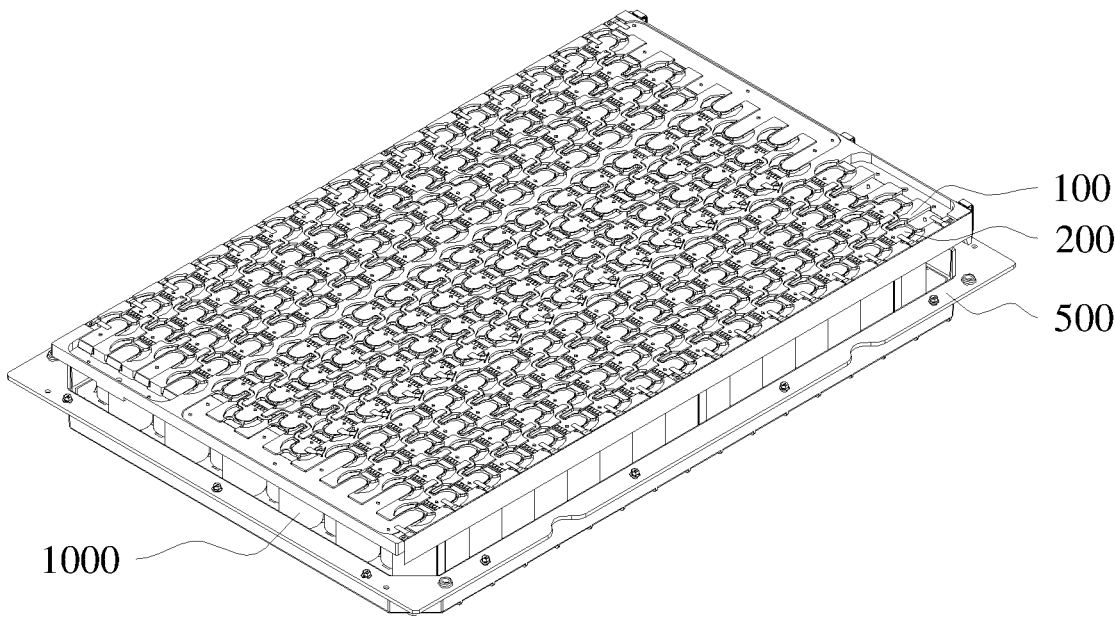
FIG. 7 is an assembly schematic diagram of a battery module structure provided by an embodiment of the present application.

Referring to FIG. 7, this embodiment also provides a battery, which includes a box and the above-mentioned battery module structure, and the battery module structure is arranged inside the box. In this battery, the tops of the cells 1000 are limited by the fixing frame 100, and the bottoms of the cells 1000 are limited by the bracket 400, so that the cells 1000 are firmly limited between the fixing frame 100 and the bracket 400 to be prevented from being short-circuited due to contact. Due to the arrangement of the through holes 440 in the bracket 400 and the pressure relief holes 510 in the tray 500, the problem of spread of high-temperature gas due to thermal runaway of the cells 1000 is effectively solved. In addition, at the tops of the cells 1000, the heat-conductive adhesive 300 is adopted to bond the bracket 400 and the bus bar 200, which greatly prevents the heat from being concentrated at the tops of the cells 1000 and facilitates dispersion of the heat, and at the same time, at the bottoms of the cells 1000, the structural adhesive 600 is adopted to fix and bond the cells 1000, the bracket 400 and the tray 500, so that the whole structure is compact and the strength is high.

The invention claimed is:

1. A cell contacting system (CCS), arranged at tops of a plurality of cells, wherein a gap is formed between each two adjacent cells of the plurality of cells, and the CCS comprises:

a fixing frame, arranged at the tops of the plurality of cells, and provided with a plurality of positioning protrusions, wherein each of the plurality of positioning protrusions extends into a gap between corresponding adjacent cells and makes contact with side faces of the corresponding adjacent cells, and the fixing frame is also provided with a plurality of installation holes; and a bus bar, embedded in the plurality of installation holes, wherein the bus bar makes contact with the plurality of cells and electrically connects the plurality of cells;

wherein the cell contacting system further comprises a heat-conductive adhesive, wherein the heat-conductive adhesive is arranged on end faces of the fixing frame and the bus bar, and can bond the fixing frame and the bus bar.

2. The CCS according to claim 1, wherein the bus bar is provided with a plurality of positioning holes, the fixing frame is provided with a plurality of positioning columns, and each of the plurality of positioning columns passes through a corresponding positioning hole.

3. The CCS according to claim 1, wherein the fixing frame is provided with a plurality of installation grooves, the bus bar is arranged in the plurality of installation grooves, each of the plurality of installation holes is formed in a bottom face of a corresponding installation groove, a side edge of the bus bar, the bottom face of each of the plurality of installation grooves, and a side wall of each of the plurality of installation grooves define an adhesive storage groove, and the adhesive storage groove can accommodate the heat-conductive adhesive.

4. The CCS according to claim 1, wherein the fixing frame is provided with a plurality of adhesive passing holes, the plurality of adhesive passing holes are located at top ends of the plurality of cells, and the heat-conductive adhesive can fill the plurality of adhesive passing holes and makes contact with the top ends of the plurality of cells.

5. The CCS according to claim 1, wherein the bus bar comprises a plurality of positive electrode connecting parts and a plurality of negative electrode connecting parts, each of the plurality of installation holes comprises a positive electrode installation hole and a negative electrode installation hole, each of the plurality of positive electrode connecting parts passes through a corresponding positive electrode installation hole and is electrically connected with a positive electrode of a corresponding cell of the plurality of cells, and each of the plurality of negative electrode connecting parts passes through a corresponding negative electrode installation hole and is electrically connected with a negative electrode of a corresponding cell of the plurality of cells.

6. A battery module structure, comprising the cell contacting system (CCS) according to claim 1, and further comprising a bracket and a plurality of cells, wherein a bottom face of the bracket is provided with a plurality of placing parts, a positioning part is arranged along a periphery of each of the plurality of placing parts, each of the plurality of placing parts and a corresponding positioning part define an accommodating groove, a bottom of each of the plurality of cells is placed in a corresponding accommodating groove, and the plurality of cells and the bracket are fixedly connected by structural adhesive.

7. The CCS according to claim 3, wherein the fixing frame is provided with a plurality of adhesive passing holes, the plurality of adhesive passing holes are located at top ends of the plurality of cells, and the heat-conductive adhesive can fill the plurality of adhesive passing holes and makes contact with the top ends of the plurality of cells.

8. The CCS according to claim 2, wherein the bus bar comprises a plurality of positive electrode connecting parts and a plurality of negative electrode connecting parts, each of the plurality of installation holes comprises a positive electrode installation hole and a negative electrode installation hole, each of the plurality of positive electrode connecting parts passes through a corresponding positive electrode installation hole and is electrically connected with a positive electrode of a corresponding cell of the plurality of cells, and each of the plurality of negative electrode connecting parts passes through a corresponding negative electrode installation hole and is electrically connected with a negative electrode of a corresponding cell of the plurality of cells.

9. The CCS according to claim 3, wherein the bus bar comprises a plurality of positive electrode connecting parts and a plurality of negative electrode connecting parts, each of the plurality of installation hole holes comprises a positive electrode installation hole and a negative electrode installation hole, each of the plurality of positive electrode connecting parts passes through a corresponding positive electrode installation hole and is electrically connected with a positive electrode of a corresponding cell of the plurality of cells, and each of the plurality of negative electrode connecting parts passes through a corresponding negative electrode installation hole and is electrically connected with a negative electrode of a corresponding cell of the plurality of cells.

10. The battery module structure according to claim 6, wherein the positioning part comprises a plurality of positioning blocks which are arranged at intervals.

11. The battery module structure according to claim 10, wherein each of the plurality of positioning blocks is arranged at a joint between adjacent placing parts.

12. The battery module structure according to claim 10, wherein a side face of each of the plurality of positioning blocks is provided with a groove.

13. The battery module structure according to claim 10, wherein for each of the plurality of positioning blocks, a thickness of a top is smaller than a thickness of a bottom.

14. The battery module structure according to claim 6, further comprising a tray, wherein the bracket is arranged on the tray, the tray is provided with a plurality of pressure relief holes, each of the plurality of placing parts is provided with a through hole, and each of the plurality of pressure relief holes communicates with a corresponding through hole.

15. The battery module structure according to claim 14, wherein the bracket is provided with a plurality of adhesive overflow holes, an adhesive injection space is formed between the bracket and the tray, and the structural adhesive can flow to the adhesive injection space through the gap between each two adjacent cells of the plurality of cells and the plurality of adhesive overflow holes.

16. The battery module structure according to claim 14, wherein an edge of each through hole is provided with a ring rib which forms a communication channel between each of the plurality of pressure relief holes and the corresponding through hole, and the ring rib makes contact with the tray.

17. The battery module structure according to claim 16, wherein each of the plurality of placing parts is provided with a raised edge, the raised edge faces the tray, and the raised edge is configured to increase contact area between the structural adhesive and the bracket.

18. A battery, comprising a box, and the battery module structure according to claim 6, wherein the battery module structure is arranged inside the box.

* * * * *